US008640160B2

(12) United States Patent
Stefanik et al.

(10) Patent No.: US 8,640,160 B2
(45) Date of Patent: Jan. 28, 2014

(54) METHOD AND SYSTEM FOR PROVIDING TARGETED ADVERTISEMENTS

(75) Inventors: John R. Stefanik, Atlanta, GA (US); Robert A. Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1061 days.

(21) Appl. No.: 11/186,163

(22) Filed: Jul. 21, 2005

(65) Prior Publication Data

US 2005/0251820 A1    Nov. 10, 2005

Related U.S. Application Data

(63) Continuation-in-part of application No. 10/778,345, filed on Feb. 17, 2004, now Pat. No. 8,132,202, which is a continuation of application No. 09/467,889, filed on Dec. 21, 1999, now Pat. No. 6,718,551, which is a continuation-in-part of application No. 08/779,306, filed on Jan. 6, 1997, now abandoned, and a continuation-in-part of application No. 09/496,825, filed on Feb. 1, 2000.

(51) Int. Cl.
H04N 7/10 (2006.01)
H04N 7/173 (2011.01)

(52) U.S. Cl.
USPC ............................................. 725/32; 725/109

(58) Field of Classification Search
USPC .................................................. 725/32, 109
See application file for complete search history.

(56) References Cited

U.S. PATENT DOCUMENTS

| 677,209 A | 6/1901 | Chernock et al. |
| 3,798,610 A | 3/1974 | Bliss et al. |
| 3,886,302 A | 5/1975 | Kosco |
| 3,924,187 A * | 12/1975 | Dormans ...................... 725/125 |
| 4,130,833 A | 12/1978 | Chomet |
| 4,258,386 A | 3/1981 | Cheung |
| 4,361,851 A | 11/1982 | Asip et al. |
| 4,488,179 A | 12/1984 | Kruger et al. |
| 4,566,030 A | 1/1986 | Nickerson et al. |
| 4,567,591 A | 1/1986 | Gray et al. |
| 4,598,288 A | 7/1986 | Yarbrough et al. |
| 4,602,279 A | 7/1986 | Freeman |
| 4,688,248 A | 8/1987 | Tomizawa |
| 4,689,661 A | 8/1987 | Barbieri et al. |

(Continued)

FOREIGN PATENT DOCUMENTS

| EP | 0 424 648 | 2/1991 |
| EP | 0 424 648 A | 2/1991 |

(Continued)

OTHER PUBLICATIONS

U.S. Appl. No. 09/799,306, filed Jan. 6, 1997, Grauch.

(Continued)

*Primary Examiner* — Pankaj Kumar
*Assistant Examiner* — Franklin Andramuno
(74) *Attorney, Agent, or Firm* — Scott P. Zimmerman, PLLC

(57) ABSTRACT

Methods, systems, and devices are disclosed that target content to a subscriber. One such device has a processor communicating with memory. The processor receives a library of content associated with a demographic and stores the library in memory. The processor receives an instruction to retrieve particular content from the library of content and inserts the particular content in an insertion slot.

33 Claims, 5 Drawing Sheets

(56) References Cited

U.S. PATENT DOCUMENTS

| | | | |
|---|---|---|---|
| 4,697,209 A | 9/1987 | Kiewitt et al. | |
| 4,698,670 A | 10/1987 | Matty | |
| 4,720,873 A | 1/1988 | Goodman et al. | |
| 4,816,904 A | 3/1989 | McKenna et al. | |
| 4,885,632 A | 12/1989 | Mabey et al. | |
| 4,890,322 A | 12/1989 | Russell, Jr. | |
| 4,912,552 A | 3/1990 | Allison, III et al. | |
| 5,010,585 A | 4/1991 | Garcia | |
| 5,038,211 A | 8/1991 | Hallenbeck | |
| 5,046,090 A | 9/1991 | Walker et al. | |
| 5,046,092 A | 9/1991 | Walker et al. | |
| 5,055,924 A | 10/1991 | Skutta | |
| 5,173,900 A | 12/1992 | Miller et al. | |
| 5,191,645 A | 3/1993 | Carlucci et al. | |
| 5,208,665 A | 5/1993 | McCalley et al. | |
| 5,247,347 A | 9/1993 | Litteral et al. | |
| 5,249,044 A | 9/1993 | VonKohorn | |
| 5,251,324 A | 10/1993 | McMullan | |
| 5,287,181 A | 2/1994 | Holman | |
| 5,335,277 A | 8/1994 | Harvey et al. | |
| 5,339,315 A | 8/1994 | Maeda et al. | |
| 5,343,240 A | 8/1994 | Yu | |
| 5,357,276 A | 10/1994 | Banker et al. | |
| 5,374,951 A | 12/1994 | Welsh | |
| 5,382,970 A | 1/1995 | Kiefl | |
| 5,389,964 A | 2/1995 | Oberle | |
| 5,404,393 A | 4/1995 | Remillard | |
| 5,410,326 A | 4/1995 | Goldstein | |
| 5,410,344 A | 4/1995 | Graves | |
| 5,436,653 A * | 7/1995 | Ellis et al. | 725/22 |
| 5,440,334 A | 8/1995 | Walters et al. | |
| 5,444,499 A | 8/1995 | Saitoh | |
| 5,446,490 A | 8/1995 | Blahut et al. | |
| 5,446,919 A * | 8/1995 | Wilkins | 725/35 |
| 5,481,294 A | 1/1996 | Thomas et al. | |
| 5,497,185 A | 3/1996 | Dufresne et al. | |
| 5,500,681 A | 3/1996 | Jones | |
| 5,504,519 A | 4/1996 | Remillard | |
| 5,532,732 A | 7/1996 | Yuen et al. | |
| 5,532,735 A * | 7/1996 | Blahut et al. | 725/32 |
| 5,534,911 A | 7/1996 | Levitan | |
| 5,537,143 A | 7/1996 | Steingold et al. | |
| 5,559,548 A | 9/1996 | Davis et al. | |
| 5,579,124 A | 11/1996 | Aijala et al. | |
| 5,585,838 A | 12/1996 | Lawler et al. | |
| 5,585,865 A | 12/1996 | Amano | |
| 5,589,892 A | 12/1996 | Knee et al. | |
| 5,596,994 A | 1/1997 | Bro | |
| 5,600,364 A | 2/1997 | Hendricks et al. | |
| 5,600,366 A * | 2/1997 | Schulman | 725/36 |
| 5,606,359 A | 2/1997 | Youden et al. | |
| 5,606,602 A * | 2/1997 | Johnson et al. | 379/114.02 |
| 5,608,448 A | 3/1997 | Smoral et al. | |
| 5,619,247 A | 4/1997 | Russo | |
| 5,630,119 A | 5/1997 | Aristides | |
| 5,649,200 A * | 7/1997 | Leblang et al. | 717/122 |
| 5,659,350 A | 8/1997 | Hendricks et al. | |
| 5,661,516 A | 8/1997 | Carles | |
| 5,710,815 A * | 1/1998 | Ming et al. | 380/241 |
| 5,721,827 A * | 2/1998 | Logan et al. | 709/217 |
| 5,724,521 A | 3/1998 | Dedrick | |
| 5,724,525 A | 3/1998 | Beyers, II et al. | |
| 5,724,607 A * | 3/1998 | Brandt | 710/5 |
| 5,740,549 A * | 4/1998 | Reilly et al. | 705/14.42 |
| 5,752,159 A | 5/1998 | Faust et al. | |
| 5,754,775 A | 5/1998 | Adamson et al. | |
| 5,754,939 A | 5/1998 | Herz et al. | |
| 5,758,257 A | 5/1998 | Herz | |
| 5,758,259 A | 5/1998 | Lawler | |
| 5,774,170 A | 6/1998 | Hite et al. | |
| 5,777,614 A * | 7/1998 | Ando et al. | 715/729 |
| 5,778,182 A | 7/1998 | Cathey et al. | |
| 5,794,210 A | 8/1998 | Goldhaber et al. | |
| 5,796,952 A | 8/1998 | Davis et al. | |
| 5,798,785 A | 8/1998 | Hendricks et al. | |
| 5,809,481 A | 9/1998 | Baron et al. | |
| 5,818,438 A | 10/1998 | Howe et al. | |
| 5,838,314 A | 11/1998 | Neel | |
| 5,848,396 A | 12/1998 | Gerace | |
| 5,848,397 A | 12/1998 | Marsh et al. | |
| 5,850,249 A | 12/1998 | Massetti et al. | |
| 5,850,447 A | 12/1998 | Peyret | |
| 5,854,897 A | 12/1998 | Radziewicz et al. | |
| 5,861,906 A | 1/1999 | Dunn | |
| 5,867,226 A | 2/1999 | Wehmeyer et al. | |
| 5,872,588 A | 2/1999 | Aras et al. | |
| 5,872,834 A | 2/1999 | Teitelbaum et al. | |
| 5,883,942 A | 3/1999 | Lim et al. | |
| 5,892,508 A | 4/1999 | Howe | |
| 5,892,536 A | 4/1999 | Logan | |
| 5,900,908 A * | 5/1999 | Kirkland | 348/62 |
| 5,901,209 A | 5/1999 | Tannenbaum et al. | |
| 5,917,481 A | 6/1999 | Rzeszewski et al. | |
| 5,931,908 A | 8/1999 | Gerba et al. | |
| 5,945,988 A | 8/1999 | Williams et al. | |
| 5,946,636 A | 8/1999 | Uyeno et al. | |
| 5,948,061 A * | 9/1999 | Merriman et al. | 709/219 |
| 5,973,683 A | 10/1999 | Cragun | |
| 5,983,227 A | 11/1999 | Nazem | |
| 5,991,735 A * | 11/1999 | Gerace | 705/10 |
| 5,991,799 A | 11/1999 | Yen et al. | |
| 6,002,393 A | 12/1999 | Hite | |
| 6,005,597 A | 12/1999 | Barrett | |
| 6,026,368 A * | 2/2000 | Brown et al. | 705/14 |
| 6,029,045 A | 2/2000 | Picco et al. | |
| 6,029,195 A | 2/2000 | Herz | |
| 6,076,094 A | 6/2000 | Cohen | |
| 6,081,840 A | 6/2000 | Zhao | |
| 6,100,916 A | 8/2000 | August | |
| 6,119,098 A | 9/2000 | Guyot et al. | |
| 6,128,009 A | 10/2000 | Ohkura et al. | |
| 6,134,531 A | 10/2000 | Trewitt et al. | |
| 6,134,532 A | 10/2000 | Lazarus | |
| 6,160,570 A | 12/2000 | Sitnik | |
| 6,163,644 A | 12/2000 | Owashi et al. | |
| 6,172,674 B1 | 1/2001 | Ethridge | |
| 6,172,677 B1 * | 1/2001 | Stautner et al. | 715/716 |
| 6,177,931 B1 | 1/2001 | Alexander et al. | |
| D437,879 S | 2/2001 | Weinandt | |
| 6,185,614 B1 | 2/2001 | Cuomo | |
| 6,199,076 B1 | 3/2001 | Logan et al. | |
| 6,202,210 B1 | 3/2001 | Ludtke | |
| 6,226,618 B1 | 5/2001 | Downs et al. | |
| 6,236,975 B1 | 5/2001 | Boe | |
| 6,252,586 B1 | 6/2001 | Freeman et al. | |
| 6,253,189 B1 | 6/2001 | Feezell et al. | |
| 6,279,157 B1 | 8/2001 | Takasu | |
| 6,282,713 B1 | 8/2001 | Kitsukawa | |
| 6,286,042 B1 | 9/2001 | Hasselberg et al. | |
| 6,292,549 B1 | 9/2001 | Lung et al. | |
| 6,304,644 B2 | 10/2001 | Karnowski | |
| 6,310,943 B1 | 10/2001 | Kowalski | |
| 6,314,568 B1 | 11/2001 | Ochiai | |
| 6,314,577 B1 | 11/2001 | Pocock | |
| 6,317,488 B1 | 11/2001 | DePond et al. | |
| 6,324,271 B1 | 11/2001 | Sawyer et al. | |
| 6,327,574 B1 | 12/2001 | Kramer et al. | |
| 6,332,021 B2 | 12/2001 | Latter et al. | |
| 6,338,043 B1 | 1/2002 | Miller | |
| 6,339,639 B1 | 1/2002 | Henderson | |
| 6,341,161 B1 | 1/2002 | Latter et al. | |
| 6,345,187 B1 | 2/2002 | Berthoud et al. | |
| 6,345,256 B1 | 2/2002 | Milsted et al. | |
| 6,351,637 B1 | 2/2002 | Lee | |
| 6,353,929 B1 | 3/2002 | Houston | |
| 6,366,772 B1 | 4/2002 | Arnson | |
| 6,397,057 B1 * | 5/2002 | Malackowski et al. | 455/414.1 |
| 6,400,408 B1 | 6/2002 | Berger | |
| 6,408,437 B1 | 6/2002 | Hendricks et al. | |
| 6,427,003 B1 | 7/2002 | Corbett | |
| 6,434,747 B1 | 8/2002 | Khoo et al. | |
| 6,438,216 B1 | 8/2002 | Aktas | |
| 6,442,262 B1 | 8/2002 | Moss et al. | |
| 6,442,263 B1 | 8/2002 | Beaton et al. | |

(56) References Cited

U.S. PATENT DOCUMENTS

| | | |
|---|---|---|
| 6,445,781 B1 | 9/2002 | Heinmiller et al. |
| 6,446,261 B1 | 9/2002 | Rosser |
| 6,457,010 B1 | 9/2002 | Eldering |
| 6,463,468 B1 | 10/2002 | Buch |
| 6,463,585 B1 | 10/2002 | Hendricks et al. |
| 6,477,704 B1 | 11/2002 | Cremia |
| 6,480,589 B1 | 11/2002 | Lee et al. |
| 6,487,538 B1 | 11/2002 | Gupta et al. |
| 6,493,439 B2 | 12/2002 | Lung et al. |
| 6,496,569 B2 | 12/2002 | Pelletier et al. |
| 6,496,571 B1 | 12/2002 | Wilson |
| 6,496,818 B1 | 12/2002 | Ponte |
| 6,498,841 B2 | 12/2002 | Bull et al. |
| 6,505,348 B1 | 1/2003 | Knowles |
| 6,507,839 B1 | 1/2003 | Ponte |
| 6,510,417 B1 | 1/2003 | Woods |
| 6,529,591 B1 | 3/2003 | Dosani et al. |
| 6,530,082 B1 | 3/2003 | DelSesto et al. |
| 6,542,583 B1 | 4/2003 | Taylor |
| 6,542,591 B1 | 4/2003 | Amro et al. |
| 6,546,092 B2 | 4/2003 | Corbett et al. |
| 6,553,110 B1 | 4/2003 | Peng |
| 6,553,178 B2 * | 4/2003 | Abecassis ................ 386/291 |
| 6,560,317 B1 | 5/2003 | Quagliana |
| 6,560,327 B1 | 5/2003 | McConnell |
| 6,570,971 B2 | 5/2003 | Latter et al. |
| 6,571,344 B1 | 5/2003 | Sitnik |
| 6,574,319 B2 | 6/2003 | Latter et al. |
| 6,584,490 B1 | 6/2003 | Schuster et al. |
| 6,631,181 B1 | 10/2003 | Bates et al. |
| 6,631,360 B1 | 10/2003 | Cook |
| 6,639,979 B1 | 10/2003 | Kim |
| 6,647,548 B1 | 11/2003 | Lu et al. |
| 6,650,743 B2 | 11/2003 | Heinmiller et al. |
| 6,675,383 B1 | 1/2004 | Wheeler et al. |
| 6,698,020 B1 | 2/2004 | Zigmond et al. |
| 6,714,992 B1 | 3/2004 | Kanojia et al. |
| 6,718,021 B2 | 4/2004 | Crockett et al. |
| 6,718,551 B1 | 4/2004 | Swix et al. |
| 6,728,355 B2 | 4/2004 | Kowalski |
| 6,731,727 B2 | 5/2004 | Corbett et al. |
| 6,738,978 B1 * | 5/2004 | Hendricks et al. .......... 725/35 |
| 6,748,058 B1 | 6/2004 | Schwend et al. |
| 6,748,068 B1 | 6/2004 | Walsh et al. |
| 6,757,691 B1 | 6/2004 | Welsh et al. |
| 6,766,003 B2 | 7/2004 | Moss et al. |
| 6,766,524 B1 | 7/2004 | Matheny et al. |
| D494,953 S | 8/2004 | Leung |
| 6,771,754 B2 | 8/2004 | Pelletier et al. |
| 6,771,755 B1 | 8/2004 | Simpson |
| 6,772,209 B1 | 8/2004 | Chernock et al. |
| 6,785,301 B1 | 8/2004 | Chapman et al. |
| 6,785,368 B1 | 8/2004 | Eason et al. |
| 6,798,879 B1 | 9/2004 | Beham |
| 6,807,267 B2 | 10/2004 | Moss et al. |
| 6,810,115 B2 | 10/2004 | Fukuda |
| 6,810,527 B1 | 10/2004 | Conrad et al. |
| 6,816,481 B1 | 11/2004 | Adams et al. |
| 6,826,271 B1 | 11/2004 | Kanabar et al. |
| 6,831,974 B1 | 12/2004 | Watson et al. |
| 6,845,151 B2 | 1/2005 | Peng |
| 6,845,396 B1 | 1/2005 | Kanojia |
| 6,845,398 B1 | 1/2005 | Galensky |
| 6,850,988 B1 | 2/2005 | Reed |
| 6,950,804 B2 | 9/2005 | Strietzel |
| 6,970,641 B1 | 11/2005 | Pierre |
| 6,976,268 B2 | 12/2005 | Courtney |
| 6,983,478 B1 | 1/2006 | Grauch et al. |
| 6,985,882 B1 | 1/2006 | Del Sesto |
| 7,000,245 B1 | 2/2006 | Pierre |
| 7,010,492 B1 | 3/2006 | Bassett et al. |
| 7,020,336 B2 | 3/2006 | Cohen-Solal |
| 7,020,652 B2 | 3/2006 | Matz |
| 7,039,599 B2 | 5/2006 | Merriman |
| 7,039,932 B2 | 5/2006 | Eldering |
| 7,086,075 B2 | 8/2006 | Swix |
| 7,100,183 B2 | 8/2006 | Kunkel et al. |
| 7,212,979 B1 | 5/2007 | Matz et al |
| 7,228,283 B1 | 6/2007 | Hornstein |
| 7,260,823 B2 | 8/2007 | Schlack et al. |
| 7,269,835 B2 | 9/2007 | Swix |
| 7,343,354 B2 | 3/2008 | Hennessey |
| 7,441,260 B1 | 10/2008 | Kurapati |
| 7,444,658 B1 | 10/2008 | Matz |
| 7,587,323 B2 | 9/2009 | Matz |
| 7,587,732 B2 | 9/2009 | Wright et al. |
| 7,593,858 B2 | 9/2009 | Matz |
| 7,617,508 B2 | 11/2009 | Gray |
| 7,661,118 B2 | 2/2010 | Matz |
| 7,979,877 B2 | 7/2011 | Huber et al. |
| 2001/0004733 A1 | 6/2001 | Eldering |
| 2002/0002488 A1 | 1/2002 | Muyres et al. |
| 2002/0004382 A1 | 1/2002 | Cox et al. |
| 2002/0009184 A1 | 1/2002 | Shnier |
| 2002/0013757 A1 | 1/2002 | Bykowsky |
| 2002/0016748 A1 | 2/2002 | Emodi et al. |
| 2002/0016964 A1 | 2/2002 | Aratani et al. |
| 2002/0032906 A1 | 3/2002 | Grossman |
| 2002/0035600 A1 | 3/2002 | Ullman et al. |
| 2002/0038455 A1 | 3/2002 | Srinivasan et al. |
| 2002/0046099 A1 | 4/2002 | Frengut et al. |
| 2002/0049631 A1 | 4/2002 | Williams |
| 2002/0049967 A1 | 4/2002 | Haseltine et al. |
| 2002/0056109 A1 | 5/2002 | Tomsen |
| 2002/0056118 A1 | 5/2002 | Hunter et al. |
| 2002/0078443 A1 | 6/2002 | Gadkari et al. |
| 2002/0083441 A1 | 6/2002 | Flickinger et al. |
| 2002/0087573 A1 | 7/2002 | Reuning et al. |
| 2002/0090933 A1 | 7/2002 | Rouse et al. |
| 2002/0092017 A1 | 7/2002 | Klosterman et al. |
| 2002/0092019 A1 | 7/2002 | Marcus |
| 2002/0100064 A1 | 7/2002 | Ward et al. |
| 2002/0122401 A1 | 9/2002 | Xiang et al. |
| 2002/0123928 A1 | 9/2002 | Eldering et al. |
| 2002/0133817 A1 | 9/2002 | Markel |
| 2002/0143647 A1 | 10/2002 | Headings et al. |
| 2002/0157108 A1 | 10/2002 | Kitsukawa et al. |
| 2002/0157109 A1 | 10/2002 | Nakano et al. |
| 2002/0169709 A1 | 11/2002 | Kitayama |
| 2002/0183098 A1 | 12/2002 | Lee et al. |
| 2002/0191755 A1 | 12/2002 | Lew et al. |
| 2002/0199197 A1 | 12/2002 | Winter |
| 2003/0003990 A1 | 1/2003 | VonKohorn |
| 2003/0028432 A1 | 2/2003 | Troyansky et al. |
| 2003/0028873 A1 | 2/2003 | Lemmons |
| 2003/0049967 A1 | 3/2003 | Narumo et al. |
| 2003/0050100 A1 | 3/2003 | Dent |
| 2003/0067554 A1 | 4/2003 | Klarfeld |
| 2003/0092384 A1 | 5/2003 | Ross, III |
| 2003/0093792 A1 | 5/2003 | Labeeb et al. |
| 2003/0095650 A1 | 5/2003 | Mize |
| 2003/0108184 A1 | 6/2003 | Brown et al. |
| 2003/0110489 A1 | 6/2003 | Gudorf et al. |
| 2003/0110497 A1 | 6/2003 | Yassin et al. |
| 2003/0115597 A1 | 6/2003 | Yassin et al. |
| 2003/0148758 A1 | 8/2003 | McMullin |
| 2003/0149975 A1 | 8/2003 | Eldering et al. |
| 2003/0172374 A1 | 9/2003 | Vinson et al. |
| 2004/0125929 A1 | 7/2004 | Pope |
| 2004/0128682 A1 | 7/2004 | Liga et al. |
| 2004/0133467 A1 | 7/2004 | Siler |
| 2004/0163101 A1 | 8/2004 | Swix |
| 2004/0193483 A1 | 9/2004 | Wolan |
| 2004/0193488 A1 | 9/2004 | Khoo et al. |
| 2004/0194131 A1 | 9/2004 | Ellis et al. |
| 2004/0220858 A1 | 11/2004 | Maggio |
| 2004/0248560 A1 | 12/2004 | Bedingfield et al. |
| 2004/0261127 A1 | 12/2004 | Freeman et al. |
| 2005/0060759 A1 | 3/2005 | Rowe et al. |
| 2005/0071863 A1 | 3/2005 | Matz |
| 2005/0084084 A1 | 4/2005 | Cook et al. |
| 2005/0132419 A1 | 6/2005 | Gray |
| 2005/0137958 A1 | 6/2005 | Huber et al. |
| 2005/0235318 A1 | 10/2005 | Grauch |

(56) References Cited

U.S. PATENT DOCUMENTS

| | | | |
|---|---|---|---|
| 2005/0251820 A1 | 11/2005 | Stefanik | |
| 2005/0278741 A1 | 12/2005 | Robarts et al. | |
| 2005/0283401 A1 | 12/2005 | Swix | |
| 2005/0283792 A1 | 12/2005 | Swix | |
| 2006/0031882 A1 | 2/2006 | Swix | |
| 2006/0075456 A1 | 4/2006 | Gray | |
| 2006/0106710 A1 | 5/2006 | Meek et al. | |
| 2006/0161952 A1* | 7/2006 | Herz et al. | 725/46 |
| 2006/0168616 A1 | 7/2006 | Candelore | |
| 2006/0253884 A1 | 11/2006 | Gray | |
| 2006/0271438 A1 | 11/2006 | Shotland et al. | |
| 2006/0271552 A1 | 11/2006 | McChesney et al. | |
| 2006/0288367 A1 | 12/2006 | Swix | |
| 2007/0038514 A1 | 2/2007 | Patterson et al. | |
| 2007/0083885 A1 | 4/2007 | Harding | |
| 2007/0226761 A1 | 9/2007 | Zalewski et al. | |
| 2007/0250846 A1 | 10/2007 | Swix | |
| 2007/0255622 A1 | 11/2007 | Swix | |
| 2007/0288350 A1 | 12/2007 | Bykowsky | |
| 2008/0004962 A1 | 1/2008 | Muthukrishnan et al. | |
| 2008/0104634 A1 | 5/2008 | Gajdos et al. | |
| 2008/0147497 A1 | 6/2008 | Tischer | |
| 2008/0148311 A1 | 6/2008 | Tischer | |
| 2008/0167943 A1 | 7/2008 | O'Neil | |
| 2008/0263586 A1 | 10/2008 | Thomas | |
| 2009/0292703 A1 | 11/2009 | Matz | |
| 2010/0083298 A1 | 4/2010 | Gray et al. | |
| 2010/0088725 A1 | 4/2010 | Swix et al. | |
| 2010/0100435 A1 | 4/2010 | Matz | |
| 2010/0191601 A1 | 7/2010 | Matz | |
| 2010/0257037 A1 | 10/2010 | Matz | |

FOREIGN PATENT DOCUMENTS

| | | |
|---|---|---|
| EP | 1162840 A2 | 12/2001 |
| WO | WO 9222983 | 12/1992 |
| WO | WO 94 17609 | 8/1994 |
| WO | WO 96 07270 | 3/1996 |
| WO | WO 9831114 | 7/1998 |
| WO | WO 99 04561 | 1/1999 |
| WO | WO 99 04561 A | 1/1999 |
| WO | WO 99 45702 A | 9/1999 |
| WO | WO99/45702 | 10/1999 |
| WO | WO 99 52282 | 10/1999 |
| WO | WO 99 52285 A | 10/1999 |
| WO | WO 0147156 | 6/2001 |
| WO | WO 03 /052551 | 6/2003 |

OTHER PUBLICATIONS

U.S. Appl. No. 10/016,988, filed Dec. 14, 2001, Matz.
U.S. Appl. No. 10/017,111, filed Dec. 14, 2001, Matz.
U.S. Appl. No. 10/017,630, filed Dec. 14, 2001, Swix
U.S. Appl. No. 10/017,640, filed Dec. 14, 2001, Matz.
U.S. Appl. No. 10/017,742, filed Dec. 14, 2001, Matz.
U.S. Appl. No. 10/036,677, filed Dec. 21, 2001, Swix.
U.S. Appl. No. 10/735,309, filed Dec. 12, 2003, Gray.
U.S. Appl. No. 10/037,005, filed Dec. 21, 2001, Matz.
U.S. Appl. No. 10/778,345, filed Feb. 17, 2004, Swix.
U.S. Appl. No. 10/735,346, Dec. 12, 2003, Gray.
U.S. Appl. No. 10/036,923, filed Dec. 21, 2001, Matz.
PCT Publication No. WO 94/17609 (Kieft et al., Aug. 4, 1994).
Cauley, Leslie, "Microsoft, Baby Bell Form Video Alliance" *The Wall Street Journal*, Sep. 26, 1994.
"allNetDevices:—Report: Interactive TV Soon to Become Direct Marketing Tool," allNetDevices, www.devices.internet.com/com_cgi/print/print.cgi?url=http://devices . . . /report_interactive.html, (Nov. 16, 2001) pp. 1-2.
"Liberate Technologies—Solutions," Digital Cable Two-Way, www.solutions.liberate.com/architecture/dc2.html, (Nov. 16, 2001) p. 1 of 1.
"Liberate Technologies—Solutions," Digital Broadband Telco, www.solutions.liberate.com/architecture/db.html, (Nov. 16, 2001) p. 1 of 1.
"Liberate Technologies—Solutions," Liberate Connect Suite, www.solutions.liberate.com/products/connect suite.html, (Nov. 16, 2001) pp. 1-2.
"Liberate Technologies—Solutions," Liberate imprint Server™, www.solutions.liberate.com/products/imprint_server.html, (Nov. 16, 2001) p. 1 of 1.
"Liberate Technologies—Solutions," Liberate Mediacast Server™, www.solutions.liberate.com/products/mediacast_server.html, (Nov. 16, 2001) pp. 1-2.
"Spike High Performance Server Array," Mixed Signals Technologies, Inc., www.mixedsignals.com, itvinfo@mixedsignals.com (2000) p. 1.
"power, flexibility, and control," RespondTV www.respondtv.com/whyrespond.html (Nov. 16, 2001) pp. 1-2.
"It just clicks!," RespondTV, www.respondtv.com/inaction.html, (Nov. 16, 2001) pp. 1-2.
"The Wink System," Wink System Diagram, www.wink.com/contents/tech_diagram.html (Nov. 16, 2001) p. 1 of 1.
"What is Wink?," www.wink.com/contents/whatiswink.html, (Nov. 16, 2001) p. 1 of 1.
"How Wink Works," What is Wink: How wink works, www.wink.com/contents/howitworks.html (Nov. 16, 2001) p. 1 of 1.
"What is Wink: Examples," What is Wink—Examples, www.wink.com/contents/examples.html, (Nov. 16, 2001) pp. 1-2.
"Nielsen Media Research—Who We Are & What We Do," www.nielsenmedia.com/whoweare.html, (Oct. 11, 2001) pp. 1-4.
www.actv.com, Screen Print, Oct. 8, 2000.
"ACTV, Inc. Offers Exclusive Preview of 'Individualized Television' at Official All-Star Café," Business Wire, Sep. 16, 1998.
"ACTV's HyperTV & 'Individualized Television' to be Powered by Sun Microsystems' JavaTV Technology," Business Wire, Apr. 21, 1999.
Whitaker, Jerry, "Interactive TV: Killer Ap or Technical Curiosity?", Broadcast Engineering, Dec. 1999.
Dickson, Glen, "Digital TV gets specifically directed," Broadcasting & Cable, Jun. 5, 2000.
Reed, David, "The future is digital," Precision Marketing, v. 13, n. 51, p. 27, Sep. 21, 2001.
Aggarwal et al ("A Framework for the Optimizing of WWW Advertising" Proceedings fo the International IFIP/GI Working Conference Trends in Distributed Systems for Electronic Commerce, pp. 1-10, Year of Publication: 1998).
Wasserman, Todd, "Minig Everyone's Business." Brandweek, Feb. 28, 2000. 19 pages.
U.S. Appl. No. 08/779,306, Grauch.
U.S. Appl. No. 10/017,742, Matz.
U.S. Appl. No. 12/508,653, Matz.
U.S. Appl. No. 10/017,111, Matz.
U.S. Appl. No. 10/039,062, Matz.
U.S. Appl. No. 10/020,779, Swix.
U.S. Appl. No. 12/567,828, Gray.
U.S. Appl. No. 12/692,040, Swix.
U.S. Appl. No. 12/642,905, Matz.
Ehrmantraut et al., "The Personal Electronic Program Guide—Towards the Pre-selection of Individual TV Programs", 8 Pages.

* cited by examiner

METHOD AND SYSTEM FOR PROVIDING TARGETED ADVERTISEMENTS

CROSS-REFERENCE TO RELATED APPLICATIONS

This application is a continuation-in-part of U.S. application Ser. No. 10/778,345, entitled "Method and System for Providing Targeted Advertisements," filed Feb. 17, 2004 now U.S. Pat. No. 8,132,202, which is a continuation of U.S. patent application Ser. No. 09/467,889, filed Dec. 21, 1999, and now issued as U.S. Pat. No. 6,718,551, which is itself a continuation-in-part of U.S. patent application Ser. No. 08/779,306, filed Jan. 6, 1997 (now abandoned) and 09/496,825, filed Feb. 1, 2000. All these applications are herein incorporated by reference in their entirety.

BACKGROUND

The exemplary embodiments relate to the field of networked media delivery systems, and more particularly, to a method and system for providing targeted advertisements to specific consumers.

Traditionally, the preferred method of advertising has been to broadcast an advertisement to a large audience via mass media such as newspapers, magazines, radio, and television. This mass media advertising strategy seeks to reach the most number of viewers to increase the odds of contacting the ones most likely to purchase the advertised product or service. Although a large viewing audience may see the advertisement, advertisers understand that only a small percentage of that audience has a real interest in purchasing the advertised product or service. To some extent, advertisers can increase the probability of reaching purchasing consumers by creating advertisements that appeal to those potential consumers and broadcasting the advertisements in media that those same consumers are most likely to view. However, even using a popular medium to a typical potential consumer, advertisers will exclude potential consumers that do not use the medium and will include viewers of that medium who have no desire to purchase the product or service. Because of this underinclusion and overinclusion, advertisers necessarily waste at least a portion of their budgets on consumers who are not in the market to buy their product or service.

To offset this unnecessary spending, advertisers continually strive to narrow advertising efforts to a targeted purchasing audience. As briefly stated above, one targeting method distributes advertisements in media content that attract demographic groups likely to purchase the advertised product or service. For example, television shows often appeal to a particular type of audience, marked perhaps by age, income, or education. Usually, the specific sponsors of the shows sell products that appeal to the same particular audience. Similarly, in print media, advertisers choose magazines and newspapers with the content, style, and geographic coverage that attract readers likely to be interested in the advertised products or services.

In another targeting method, advertisers pay the mass media to deliver advertisements as a part of the media content. This method embeds the advertisement in the media content such that the viewer must view the advertisement to view the media content. For example, some radio and television programs incorporate advertising pitches into the program commentary or discussions. Other targeting techniques display advertisements concurrently with the media content, such as with corporate sponsored scoreboard icons in the corner of a television screen, or with logos incorporated into uniforms or equipment (e.g., race cars) that are repeatedly shown during a sports event broadcast. Another embedded advertising technique has film actors or actresses that use the advertiser's products during their acting.

Although the targeting techniques described above focus on a smaller consumer audience, the overinclusion and underinclusion inherent in mass media advertising remain their principal drawbacks. In each targeting strategy, advertisers waste money by reaching people who are not interested in the product or service or by excluding those people who are interested. Because these techniques assess consumer interest on the larger scale of program audiences instead of on an individual viewer basis, the techniques will always suffer from the squandered advertising dollars associated with overinclusion and underinclusion.

To address the drawbacks to mass media, advertisers sometimes use direct mailings and niche print media to reach targeted consumer audiences. Direct mailings and niche magazines focus on specific potential purchasers or classes of purchasers. For example, a pharmaceutical company can use targeted mailings to deliver its advertising materials directly to doctors practicing the particular type of medicine to which the advertised drug applies. As another example, boat manufacturers can advertise in a small number of magazines directed to boating enthusiasts. While these targeted print advertisements increase the efficiency of advertising efforts, they lack the powerful and influential images and sounds that a medium such as television can deliver. Thus, targeted print advertisements have only limited application and impact.

Recognizing the drawbacks to mass media and targeted print advertisements, advertisers have turned to the internet to isolate potential consumers and increase the power of their advertising dollars. On the internet, a user controls the content she views by navigating the worldwide web and accessing web pages and web advertisements. Using software, advertisers can intelligently monitor these user viewing selections, analyze viewing patterns, and deliver advertisements suiting the tastes and interests of the user. For example, if a user has repeatedly chosen to view internet advertisements for camping equipment, the software will retrieve all camping equipment advertisements that subscribe to the advertising plan and deliver them to the user. In addition, the software can retrieve advertisements for related products, such as hiking gear, and display those advertisements to the user as well. U.S. Pat. No. 5,948,061 discloses a method of delivering, targeting, and measuring advertising over networks that is representative of these types of internet targeted advertisements.

Although these internet targeted advertisements marginally increase the spending power of the advertising dollar, they still present notable disadvantages. First, despite a growing popularity, the internet has far fewer users than traditional media such as newspapers or television. The cost of purchasing a computer and maintaining internet access will continue to exclude potential consumers. In addition, many consumers, especially those of older generations, are intimidated by the seemingly complex internet technology and prefer the more familiar medium of television.

In addition to limited consumer audiences, bandwidth restrictions limit data transmission speed and hamper the quality and impact of targeted internet advertisements. Most internet users are thoroughly familiar with the long delays associated with downloading graphical information, especially video clips or other animation. These delays limit the types of advertisements that can be displayed and dampen the impact an advertisement can have on a user. Often, the consumer clicks through the web page without viewing the advertisement or occupies the downloading time with other activities such as watching television or reading.

Targeted internet advertising also has limited data from which to determine a customer profile. To collect data, the targeted internet advertising systems simply record user selections of internet advertisements, note words typed when searching web content, or read user information such as geographic location, domain type (e.g., commercial, education or government), and perhaps standard industry codes (SICs), which indicate such user characteristics as employer and type of employer. To target the advertising, the internet systems tend to deliver advertisements, e.g., banner advertisements, related to a user's previous advertisement selections or search terms without regard to the current and changing tastes of the user. In relying on previous advertisement selections or search terms, these internet systems miss the opportunity to display the types of advertisements that the user would be interested in, but has not yet seen or clicked through. Instead of being proactive and assessing a customer's tastes and delivering new, pertinent advertisements, these internet systems simply react to previous advertisement selections and deliver related advertisements.

SUMMARY

According to exemplary embodiments, a system and method provide targeted advertisements over a networked media delivery system. Broadly stated, viewing events (e.g., such as menu choices or changes in programming) are tracked and stored, the events are analyzed, and targeted advertisements are delivered that appeal to the particular subscriber generating the events. By collecting data on viewing habits and analyzing that data in light of other subscriber account information (from other subscriber databases), advertisements can be intelligently selected and displayed such that they offer products or services a viewer is truly interested in purchasing. Further, different advertisements can be delivered to different viewers watching the same program or channel. Thus, a large audience (e.g., a cable television audience) can be reached, the interests and tastes of each subscriber of that audience can be assessed, and advertisements can be delivered to each subscriber for products or services that the subscriber is predisposed to purchase. The net result is a more efficiently spent advertising dollar for the sponsors and an increased profit margin for the network media providers.

According to exemplary embodiments, the tracking and storing of event data is accomplished by use of a system for tracking network use, such as the Clickstream system of BellSouth Interactive Media Services. That network use tracking system is described, e.g., in co-pending application Ser. No. 08/779,306, entitled "Method and System for Tracking Network Use," by Batten, Grauch, Danner, Stefanik, and Swix, filed Jan. 6, 1997, which is assigned to the assignee of the present application. According to exemplary embodiments, event data gathered by a network use tracking system can include such viewing events as a channel viewed, a switch to another channel, use of a VCR or other ancillary device, or invocation of an interactive application and subscriber commands given to the system during the application. For identification and tracking, event data also includes a time stamp (to indicate, e.g., start and stop times) and the subscriber's set-top box identification.

As is apparent to those skilled in the art, the exemplary embodiments described herein may be used with numerous types of networked media delivery systems. For example, the exemplary embodiments could be deployed on an interactive media delivery system or modified for use with a conventional cable television network, a wireless cable television network, or a home satellite television network.

According to exemplary embodiments, a system and method deliver targeted advertisements to the types of consumers most likely to purchase the advertised product or service.

The exemplary embodiments provide targeted advertising that reaches a large audience, that monitors and assesses each viewer of that audience to determine purchasing interests, and that displays advertisements to each viewer corresponding to her purchasing interests.

The exemplary embodiments use an easily accessible medium to deliver targeted advertisements to the consumers most likely to purchase the advertised product.

According to exemplary embodiments, a targeted advertising system and method is provided that displays both bit map and video stream advertising.

The exemplary embodiments provide a means for displaying different commercials to individual viewers watching the same channel.

DETAILED DESCRIPTION

The exemplary embodiments describe systems and methods for providing targeted advertisements over networked media delivery systems, such as interactive media delivery systems, conventional cable television networks, wireless cable television networks, home satellite television networks, and other media delivery systems that allow duplex communication (perhaps with the return path via a separate, e.g., telephone, network) to a set-top box coupled to a subscriber's display device, such as a television. As an overview, the exemplary embodiments record the viewing selections of a subscriber, compile the viewing selection data along with other available data (e.g., interactive purchasing or questionnaire data), analyze the data to formulate a customer profile, match the customer profile to a demographic group, and display for the customer a bit map or video stream advertisement that is customized for the customer or the customer's demographic group.

Figure 1:
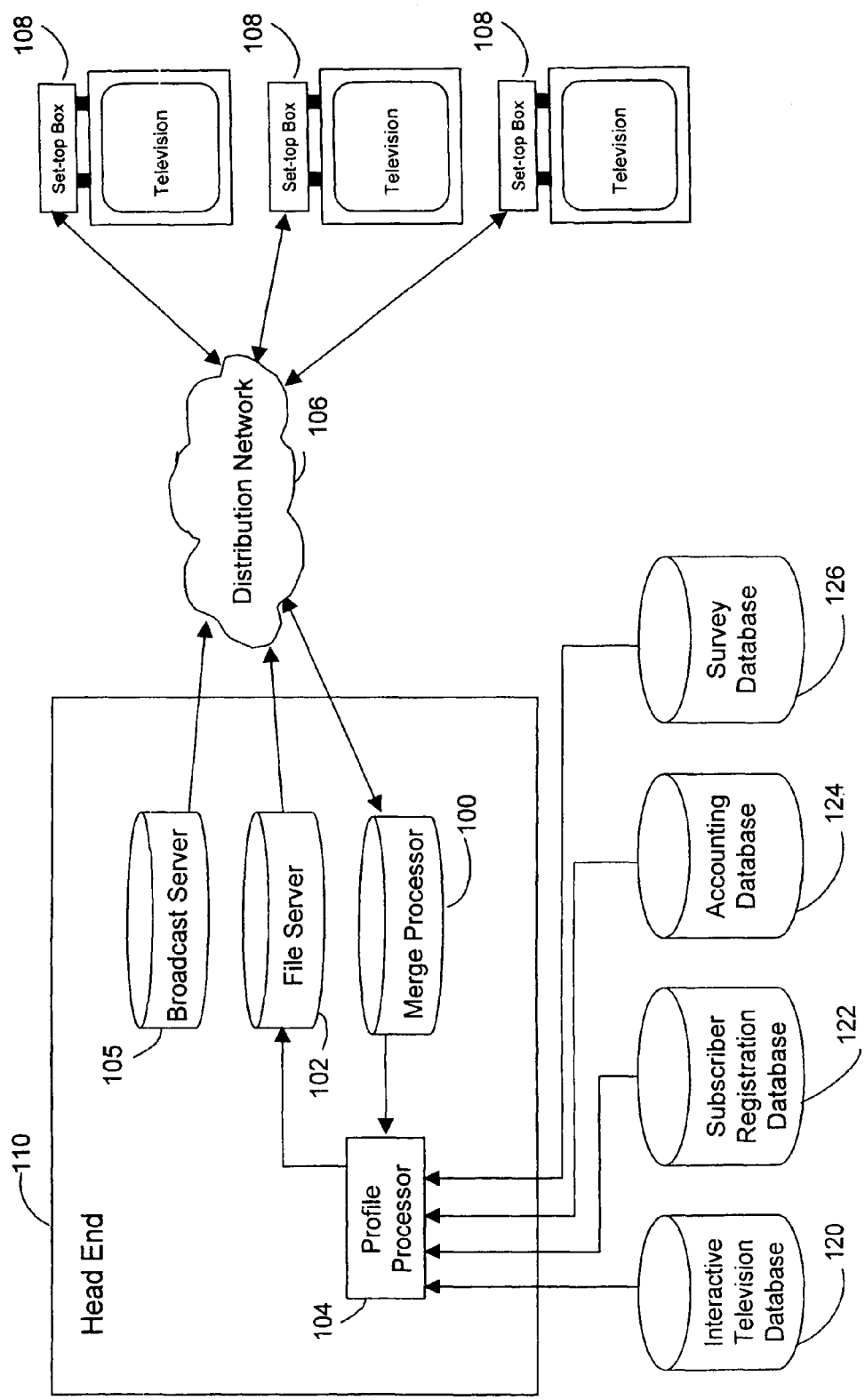
FIG. 1 is a schematic diagram of exemplary system architecture according to exemplary embodiments.

The primary components, as shown in FIG. 1, include a merge processor 100, a file server 102, a profile processor 104, and a broadcast server 105, connected to a plurality of set-top boxes 108. Together, these components record network use by individual subscribers, store and organize data associated with the network use, analyze the data to identify interests of an individual subscriber, classify the individual subscriber in a demographic group, and deliver an advertisement targeted for her demographic group to the individual subscriber. Merge processor 100, file server 102, and broadcast server 105 reside in a head end 110, typically operated by a media service provider, and are connected to a plurality of set-top boxes 108 through a distributed media delivery network 106, such as a satellite, cable, or fiber optic network. Profile processor 104 also resides in head end 110 and is connected to merge processor 100 and file server 102.

A set-top box is a network media device comprising a microprocessor, a memory buffer for operating instructions and storage, and a control interface for receiving subscriber viewing commands from a remote control device or control panel. In addition to the term "set-top box," such a network media device is sometimes referred to as a set-top terminal, a cable converter, or a home communications terminal. One or more of these terms apply generally to devices that are coupled to or made a part of a display device that shows programming to a 4 subscriber. In addition, as used in this specification and in the claims, the term "set-top box" also includes a personal computer or any other computational device that communicates with a media delivery network and performs the functions described herein. When it is connected to a viewing device, e.g., a television set at a subscriber premises, the set-top box responds to and records the viewing selections ("event data") of a subscriber. At predetermined intervals, the set-top box uploads this event data through the distributed network to the merge processor.

Merge processor 100 communicates with the plurality of set-top boxes through the distribution network. Merge processor 100 receives the event data from the set-top boxes, organizes the data, and stores the data in event lists arranged by subscriber account.

File server 102 stores display data to be delivered to the plurality of set-top boxes in response to a subscriber selection. For example, file server 102 can contain digital copies of pay-per-view movies or commercials. The display data can be in the form of text, graphic elements, bit maps, or video stream. Graphic elements are simple display images such as rectangles, lines, or circles. Bit maps define a display space, e.g., a still frame or picture, and define a color for each pixel or "bit" in the display space. Examples of graphic image file types that contain bit maps include GIF and JPEG files. Video streams are a series of frames or pictures that produce moving images or animation. Alternately, the display data could be a multimedia presentation, e.g., a Shockwave™, Flash™, or Java™ presentation.

In addition to storing and delivering display data, file server 102 also communicates with the plurality of set-top boxes, performing such functions as assigning each set-top box to a demographic group and directing each set-top box to tune to particular channels.

In contrast to the interactive sessions of file server 102, broadcast server 105 delivers a continuous stream of display data within a broadcast environment. Broadcast server 105 delivers multiple video streams on separate channels and, unlike file server 102, does not participate in dynamic interchange with the set-top boxes. Instead, the set-top boxes tune to the particular channels that contain programming corresponding to their individual demographic groups.

Profile processor 104 receives event data from merge processor 100 and additional data from several other sources to construct a consumer profile of a subscriber. In constructing a profile, profile processor 104 analyzes the data to identify a subscriber's viewing habits and corresponding interests. In addition to merge processor 100, the other data sources preferably include an interactive selection list from an interactive television database 120, subscriber data from a customer registration database 122, billing data from an accounting database 124, and perhaps questionnaire data from a survey database 126 that stores customers' specific responses to questions about their interests. Profile processor 104 uses an algorithm to systematically examine customer profile information, to determine the particular demographic group of the viewer, and to choose an advertisement that appeals to the interests of the viewer and the demographic group. Once the analysis is complete, profile processor 104 instructs file server 102 to deliver a particular advertisement to the set-top box of the viewer. Profile processor 104 performs data source analyses and issues instructions concurrently among multiple viewers so that multiple viewers watching the same show can receive different advertisements.

System Architecture

Figure 2:
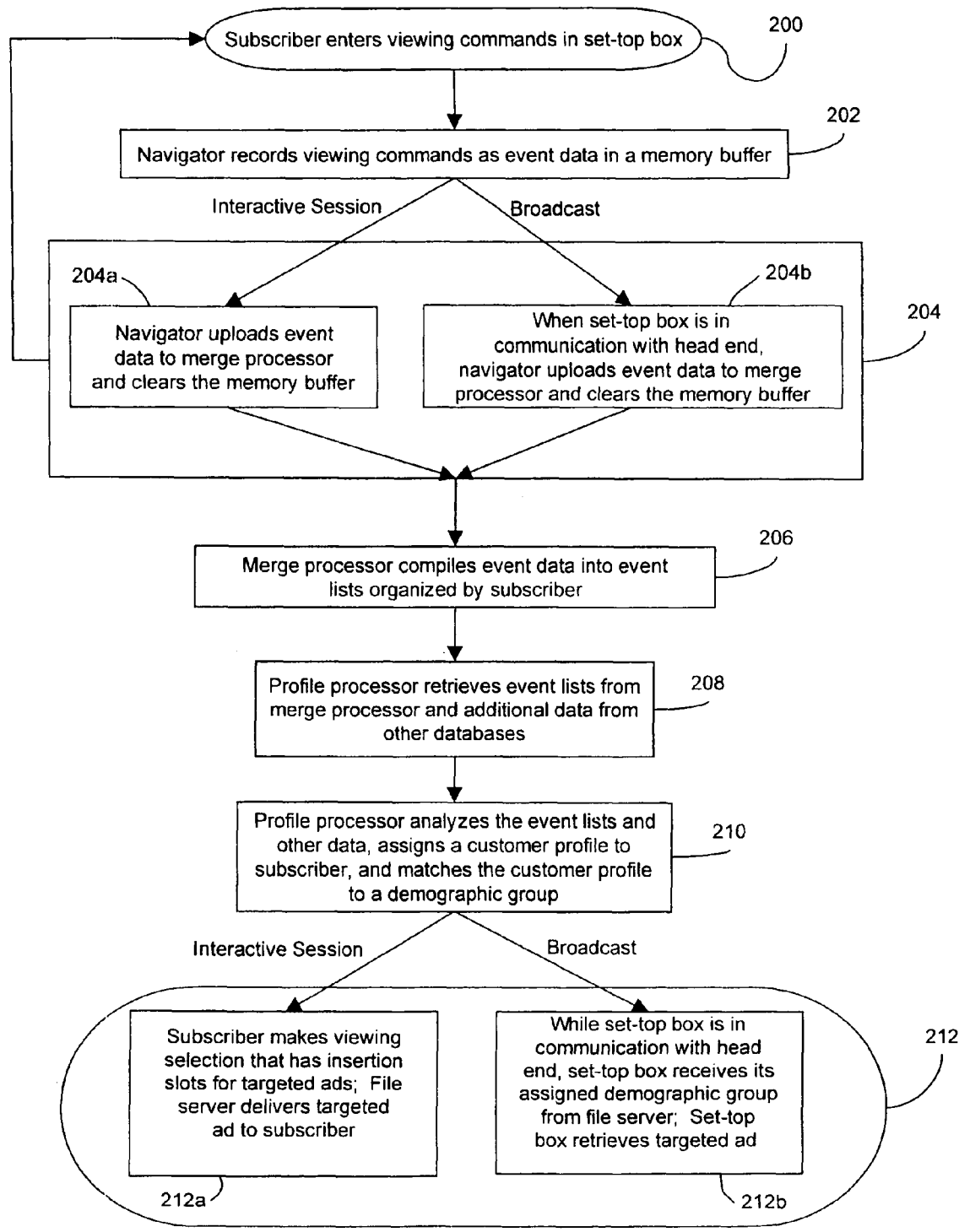
FIG. 2 is a flowchart outlining the method of delivering custom advertisements targeted to specific consumers.

Referring to FIG. 1, the exemplary embodiments include a merge processor 100, a file server 102, a profile processor 104, and a broadcast server 105. A head end 110, typically operated by a media service provider, houses merge processor 100, file server 102, profile processor 104, and broadcast server 105. Merge processor 100, file server 102, and broadcast server 105 connect to a plurality of set-top boxes 108 through a distribution network 106, which is any media delivery network such as a coaxial or fiberoptic cable system. Profile processor 104 is connected to both merge processor 100 and file server 102, as shown in FIG. 2. Each set-top box resides at a subscriber's premises, connected to a viewing device, e.g., a television.

Each set-top box of the plurality of set-top boxes 108 provides a control interface through which a subscriber makes viewing selections by, e.g., using a remote control unit, a keyboard, or a control panel. In providing this interface, a set-top box performs the following functions: (1) routes traditional broadcast signals to the connected viewing device; (2) converts media content to a selected video format (e.g., NTSC or PAL) and presents the content to the subscriber; (3) for interactive systems, exchanges messages (including display data) with merge processor 100 over distribution network 106; (4) receives messages from a subscriber input device, such as a remote control unit; (5) translates video signals from a network-native format into a format that can be used by the viewing device; (6) inserts alphanumeric or graphical information into the video stream to overlay that information on the video image; and (7) provides graphic or audio feedback to the subscriber. Examples of commercially available set-top boxes that satisfy these functions include an SA Explorer 2000 set-top box by Scientific Atlanta, a DCT-5000 set-top box by General Instruments, and a Z12C set-top box by Zenith.

Each set-top box completes many intelligent functions, including the collection, storage, exchange, and display of data. To satisfy these functions, the set-top box has a navigator, an operating system, and a memory buffer. The operating system is a computer program that, after being initially loaded into the set-top box by a bootstrap program, manages the other programs, or applications, running on the set-top box. The navigator is a software application running on top of the operating system. The navigator generates menu screens and accepts viewer menu selections such as movie orders, preview orders, or requests to watch an advertisement. Based on these selections, the navigator directs the file server to deliver the selected program, e.g., the server plays the selected movie. In addition, the navigator records viewer selections or event data in the memory buffer, and periodically (or on command) uploads the data through distribution network 106 to merge processor 100. Optionally, instead of the navigator, file server 102 could record the event data.

Merge processor 100 receives communications from the plurality of set-top boxes 108 through distribution network 106. The communications include the event data stored in the memory buffer of the plurality of set-top boxes 108. After receiving the event data, merge processor 100 organizes the data and stores the data in event lists arranged by subscriber account.

File server 102 stores the display data to be delivered to the plurality of set-top boxes 108. File server 102 delivers the data in response to subscriber viewing commands and instructions from profile processor 104. The display data can be in any form compatible with the networked media delivery system. However, the preferred forms are text, graphic elements, bit maps, and video stream. The content of the display data can be any media program, e.g., advertisements, television shows, news, movie trailers, movies, or still images, such as advertisement banners. Alternately, the display data could be a multimedia presentation.

Profile processor 104 performs the subscriber analysis and advertisement selection functions. For subscriber analysis, profile processor 104 constructs a customer profile based on subscriber data and classifies the customer profile within a demographic group. For advertisement selection in an interactive session, profile processor 104 directs file server 102 to play an advertisement that appeals to the interests of the subscriber and the demographic group. Profile processor 104 performs subscriber analyses and issues instructions concurrently among multiple viewers so that multiple viewers watching the same show can receive different advertisements.

In addition to interactive sessions, profile processor 104 also targets advertisements within a broadcast environment in which several channels of programming, each corresponding to a different demographic group, are delivered to a customer. In FIG. 1, broadcast server 105 delivers the channels of programming in this broadcast model. To target the advertisements, file server 102 directs each set-top box to tune to a channel delivering an advertisement suitable for the customer's demographic group.

In constructing a customer profile, profile processor 104 receives the event data from merge processor 100 along with any other available data from other data sources. In the exemplary embodiments, profile processor 104 receives additional data from an interactive television database 120, a subscriber registration database 122, an accounting database 124, and a survey database 126. Interactive television database 120 provides data related to the services a customer has purchased or used over interactive television, such as video on demand. Subscriber registration database 122 provides all of subscriber data recorded at service initiation, such as a subscriber's address and employer. Accounting database 124 provides subscriber billing and purchasing information, such as service purchased, service rates, and payment aging. Finally, survey database 126 provides personal information gathered from subscribers using questionnaires that solicit responses about viewing habits and purchasing interests.

System Operation

Broadly stated, the exemplary embodiments collect subscriber viewing selections, organize and analyze the selections, determine a subscriber's customer profile and demographic group, and deliver an advertisement targeted to the demographic group. The exemplary embodiments can deliver targeted advertisements as a part of an interactive television session or within a broadcast environment. Each method of delivery shares the same steps for gathering event data and analyzing a subscriber's interests.

FIG. 2 is a flowchart illustrating the steps involved in collecting and analyzing event data and delivering targeted advertisements for both the interactive session model and the broadcast model, according to exemplary embodiments.

While the steps described herein and illustrated in the flowchart contain many specific examples of information and media flow, these steps should not be construed as limitations, but rather as examples of steps that could be used to practice the exemplary embodiments. In step 200 of FIG. 2, a subscriber enters viewing commands into the set-top box using a remote control unit, a control panel, or another device. In step 202, the navigator provisioned on the set-top box records each command as event data in the memory buffer of the set-top box.

The navigator uploads the event data to merge processor 100 and clears the memory buffer in step 204. The time at which this upload occurs depends upon whether the system is delivering targeted advertisements as a part of an interactive television session or within a broadcast environment. For interactive sessions, the upload occurs at a predetermined interval or as commanded by merge processor 100, as shown in step 204a. For broadcast, the upload occurs when the set-top box first establishes communication with head end 110, as shown in step 204b. The upload also depends on whether the navigator or file server 102 is recording the event data. Although the flowchart and following description show the navigator performing this function, according to more exemplary embodiments, file server 102 records and immediately processes the event data. Having file server 102 collect the event data is preferable for an internet application in which file server 102 is the web server.

Steps 200 through 204 repeat continually as the subscriber interacts with the networked media delivery system. The longer the subscriber interacts with the system, the more event data merge processor 100 will contain from which to analyze the subscriber's viewing habits and interests. In step 206, merge processor 100 compiles the event data into event lists organized by subscriber. With the event lists tabulated, merge processor 100 is ready to provide the information necessary to assess a subscriber's viewing interests.

In step 208, profile processor 104 retrieves the event lists from merge processor 100 to begin shaping a customer profile of the subscriber. In addition, profile processor 104 draws information from all available databases, including, for example, interactive television database 120, subscriber registration database 122, accounting database 124, and survey database 126. These databases provide profile processor 104 with additional subscriber information such as address, employer, income level, favored manufacturers, banking habits, and products purchased through interactive television.

By analyzing the event data and the subscriber data from the various databases, in step 210 profile processor 104 assigns a customer profile to the subscriber and matches the customer profile to a demographic group. Generally, this analysis involves searching the event lists and subscriber data for patterns such as key words, e.g., "action" movie or "western" movie, or repeatedly selected menu items, e.g., do-it-yourself home improvement videos. As a part of this search, merge processor 100 could count the number of key words cited, the number of menu item selections, or perhaps the amount of time the subscriber viewed particular menus, and if the number or amount exceeded a certain threshold, would assign the subscriber to a certain customer profile or demographic group. The method by which an individual media service provider analyzes the event data and subscriber data depends largely on the provider's particular market strategy and business resources. As such, the optimal analysis method will vary among different service providers.

Having assigned a customer profile and demographic group to the subscriber, the system is ready to retrieve and deliver a targeted advertisement when an advertisement slot becomes available, as called for in step 212. The method by which the system retrieves and delivers the advertisement depends on whether the system is delivering targeted advertisements as a part of an interactive television session (step 204*a* above) or within a broadcast environment (step 204*b* above). For an interactive session, as shown in step 212*a*, the subscriber makes a viewing selection that has advertisement insertion slots for targeted advertisements. In response, profile processor 104 chooses an advertisement corresponding to the subscriber's customer profile and demographic group, and file server 102 delivers the advertisement to the subscriber in a menu screen or playlist.

For the broadcast environment, as shown in step 212*b*, the set-top box receives its assigned demographic group from file server 102 when the set-top box first establishes communication with head end 110 or during subsequent communications. Based on the assigned demographic group, the set-top box then retrieves the corresponding targeted advertisements. In the broadcast environment, the method by which the set-top box retrieves the targeted advertisements varies. For example, if the advertisements are video streams, the set-top box could tune to broadcast channels delivering advertisements at the appropriate time, or, for bit map advertisements, the set-top box could tune to advertisements spooled in a broadcast carousel format.

As outlined in the flowchart of FIG. 2, the system components deliver targeted advertisements in two principal ways. The first method displays bit map or video advertisements during an interactive television session as a part of menu screens or as a part of a dynamic advertisement insertion in a playlist, e.g., a playlist constructed in response to a pay-per-view movie order. The second method displays bit map or video stream advertisements as a part of a standard video broadcast.

The following descriptions and figures illustrate these methods of delivering targeted advertisements in more detail and according to exemplary embodiments. Although the exemplary embodiments are applicable to any situation in which networked media delivery systems display advertisements to subscribers, the following descriptions and schematics trace the operation of the exemplary embodiments in the context of bit maps and video streaming. While the method described herein and illustrated in the figures contains many specific examples of media flow steps, these steps should not be construed as limitations, but rather as examples of media flow steps that could be used to practice the exemplary embodiments. As would be apparent to one of ordinary skill in the art, many other variations on the system operation are possible, including differently grouped and ordered method steps. Accordingly, the scope of the exemplary embodiments should be determined not by the embodiments illustrated, but by the appended claims and their equivalents.

Each of the following methods for delivering targeted advertisements relies on the ability of head end 110 to identify a particular subscriber through the subscriber's set-top box. For each request for advertisement insertion, a set-top box can include its user identification so that head end 110 knows which event lists and database entries to consult. However, in the exemplary embodiments, the navigator of the set-top box identifies itself (and its subscriber) to head end 110 when the set-top box activates and establishes an interactive session. Thus, when the set-top box requests an advertisement insertion, head end 110 already knows the identity of the set-top box and its subscriber.

Interactive Session:

For interactive sessions, the exemplary embodiments deliver targeted advertisements during 1) interactive menu screens, or 2) in a playlist created in response to the selection of a program (e.g., a pay-per-view movie).

The delivery of a targeted bit map and video advertisement during an interactive session requires a communication between a set-top box and head end 110. Specifically, the navigator on the set-top box recognizes an advertisement insertion slot and queries head end 110 for an advertisement to insert. Based on the customer profile or demographic developed in steps 200 through 210 of FIG. 2, file server 102 of head end 110 delivers a suitable targeted advertisement.

Figure 3:
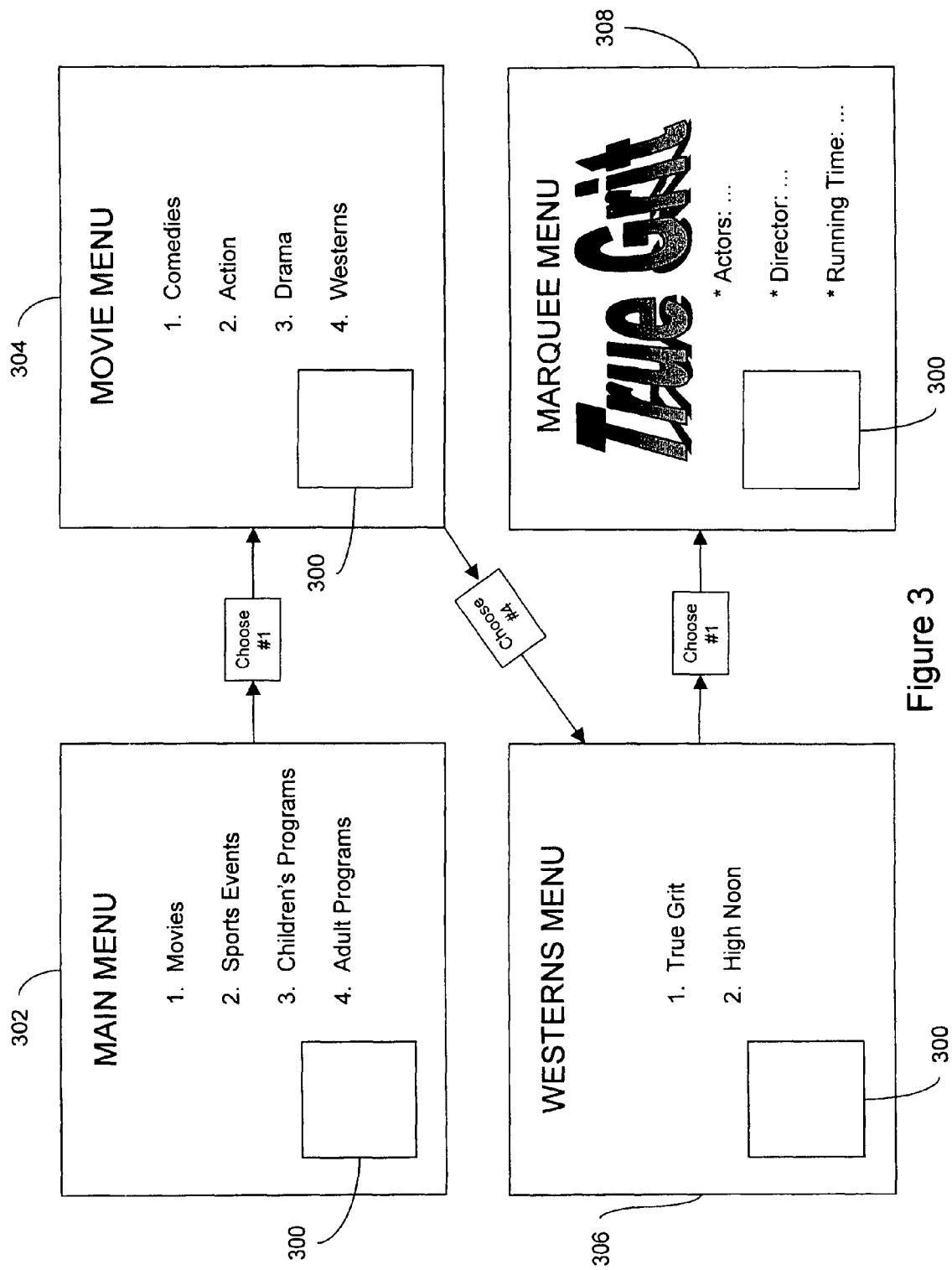
FIG. 3 is a schematic diagram illustrating progressive menu screens of a typical interactive television system.

1) Interactive Menu Screen:

In the exemplary embodiments, the advertisement insertion slot is in an interactive television menu screen. As an example, FIG. 3 shows progressive menu screens of a typical interactive television system. Each screen has an area 300 for displaying bit map or video advertisements forwarded by file server 102. In screen 302, the subscriber views the main menu having general viewing categories, such as movies, sports events, children's programs, and adult programs. After choosing "movies," in screen 304 the subscriber is presented with types of available movies, such as comedies, action, drama, and westerns. Upon choosing "westerns," screen 306 appears, giving the subscriber individual movie titles to order, such as "True Grit" and "High Noon." Finally, after ordering a particular movie, "True Grit," the interactive television system displays a marquee screen that provides information about the movie, such as lead actors, director, and running time.

During this interactive session, the navigator records each subscriber selection as event data. In the preferred embodiment, the navigator uploads the latest event data to merge processor 100 every time a new targeted advertisement must be inserted. In this manner, profile processor 100 has the latest event data, along with the data from other databases, to assess a viewer's current interests. Thus, for example, in screen 302, the exemplary embodiments could display a bit map or video movie trailer advertisement enticing the subscriber to look further into the menu options but not necessarily targeting a specific customer profile or demographic group. Then, once the subscriber has chosen "movies" and moved to screen 304, the exemplary embodiments could display a bit map or video advertisement for popcorn knowing that this particular subscriber has watched several movies in the last month (from the event data) and that the subscriber indicated a liking for popcorn in a recent consumer spending survey (from survey database 126).

As an alternative to uploading event data to merge processor 100 when a new targeted advertisement must be inserted, the upload could occur at any time, regardless of whether an advertisement insertion slot is available. In this manner, the exemplary embodiments could create and save a customer profile and playlist in advance, and display the advertisements the next time the customer begins an interactive session.

After choosing "westerns," in screen 306 the exemplary embodiments could display an advertisement for a pickup truck based on the subscriber's interest in westerns (preferably, but not necessarily, from recent event data) and previous viewing selections focusing on truck and automotive programming (from event data). Finally, after ordering the movie "True Grit," the exemplary embodiments could display a bit map or video advertisement promoting a western style restaurant chain based on the subscriber's interest in western movies (from event data) and the subscriber's previous inquiries about western style restaurants over the interactive television system (from interactive television database 120).

The selection of a bit map or video advertisement depends largely on the individual customer profile and the library of available advertisements. Both the customer profiles and the available advertisements are classified in demographic groups. Thus, the exemplary embodiments deliver advertisements classified under a certain demographic group to subscribers having customer profiles classified under the same demographic group. Preferably, the volume of advertisements in the library is large enough to satisfy a large number of demographic groups, thereby allowing more customized advertisements.

The exemplary embodiments deliver bit map or video advertisements from file server 102 to the plurality of set-top boxes 108. File server 102 can download each advertisement when a set-top box requests an advertisement for an advertisement insertion slot. However, in the exemplary embodiments, file server 102 downloads a whole library of advertisements to the navigator memory buffer when the set-top box is initially activated and then instructs the navigator to retrieve from the buffer a certain advertisement and play that advertisement to the subscriber. Although storing the advertisements in the navigator memory buffer eliminates the delay associated with downloading bit maps or video each time one is displayed, this "look ahead" buffer strategy is limited by the cache size of the navigator memory. If the cache size is small and an advertisement cannot be stored, then the navigator simply reverts to querying file server 102 and waiting for the downloading of the bit map or video advertisement. Also, to save cache capacity, preferably, head end 110 initially screens the advertisements that are to be loaded ahead of time on the set-top box and removes the advertisements that would not appeal to that specific subscriber whatsoever. For example, advertisements for women's wear would be removed from delivery to a male-only household.

Figure 4:
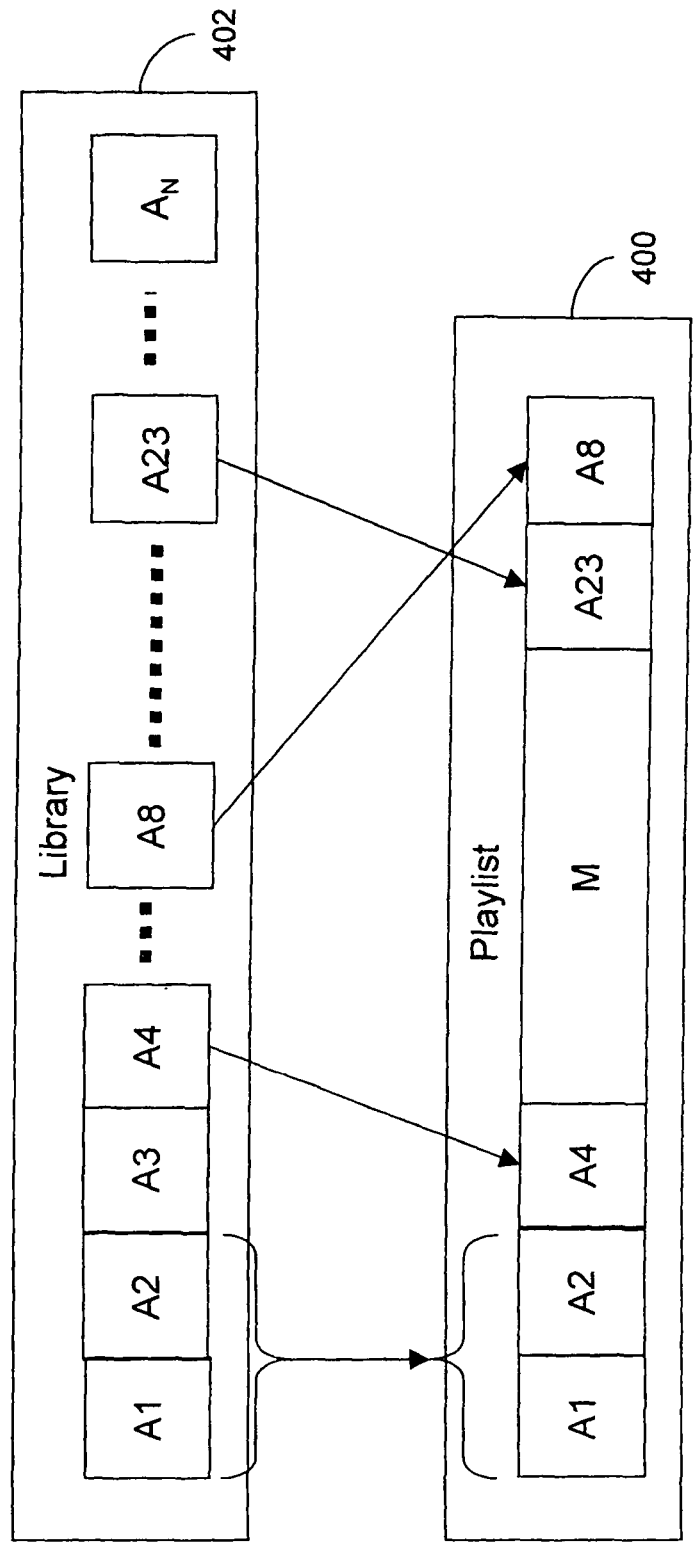
FIG. 4 is a schematic diagram of an advertisement insertion playlist method, showing an advertisement library and a playlist, according to exemplary embodiments.

2) Playlist Advertisement Insertion:

The playlist advertisement insertion method composes a series of advertisements and a program in response to a subscriber's ordering of the program, e.g., a movie. Once the subscriber orders the program, profile processor 104 assembles a playlist including the program and advertisements preceding and succeeding the program, e.g., movie trailers for other movies or perhaps CD soundtracks of the ordered movie. Such a playlist resembles the content of most movie videos rented from vendors such as Blockbuster™. As shown in FIG. 4, an example playlist 400 is three advertisements A1, A2, and A4, followed by the ordered movie M, followed by two advertisements A23 and A8.

Profile processor 104 chooses advertisements A1, A2, A4, A23, and A8 from library 402 based on the analysis performed in steps 208 through 212 of FIG. 2. Library 402 is stored in file server 102 (or, alternately, is downloaded to the navigator of a set-top box) and contains multiple advertisements $A_1$ through $A_N$, each classified by customer profile or demographic group. Thus, once profile processor 104 has assigned a customer profile to the subscriber, it merely looks for advertisements matching the profile in library 402 and inserts those advertisements into playlist 400.

The playlist advertisement insertion method enables head end 110 to dynamically build playlist 400 immediately after the subscriber has ordered a program. Thus, profile processor 104 of head end 400 can use the latest available event data of the subscriber to deliver advertisements that appeal to the subscriber's most recent interests and viewing habits.

Example

An example of the video stream playlist method of the exemplary embodiments is a pay-per-view movie service that shows commercials or movie trailers before and after a feature presentation. In this case, merge processor 100 would contain an event list of every viewing selection made by the subscriber up to the ordering of the movie. The event list could include data such as movie previews watched, movies watched, television programming watched, products ordered via interactive television, choices from interactive menus, commercials viewed, and commercials turned off. The historical extent of the data would depend on how long the exemplary embodiments were active on the subscriber's television. In addition to event data, the media service provider would also have subscriber account information such as billing.

As the subscriber progresses through the pay-per-view menu screens, events (subscriber selections) are stored in the set-top box and periodically uploaded to the server. The server collects the data and organizes it into event lists. For example, the list may show that the viewer watched a movie trailer for a movie about white water rafting, then viewed an advertisement for outdoor adventure gear, then watched a movie trailer about a wilderness hiking disaster, and finally ordered the feature movie presentation about a wilderness survival competition.

According to the exemplary embodiments, when the viewer orders the feature movie presentation, the pay-per-view service prepares to send the movie along with the commercials that will precede and follow the movie. At this point, profile processor 104 analyzes the event data and additional data, classifies the viewer in a certain demographic group, and delivers a commercial targeted for that group. As an example, given the viewer's interest in outdoor adventures, a suitable advertisement would be a commercial for a sport utility vehicle with specialized accessories that carry outdoor adventure gear. The exemplary embodiments would deliver this advertisement as a full screen video stream played prior to or after the showing of the feature movie presentation.

Broadcast Advertisement Insertion:

The broadcast advertisement insertion method inserts targeted advertisements at predetermined advertisement insertion slots in a continuous broadcast program. Broadcast server 105 delivers the continuous broadcast program in one channel and delivers other programs and advertisements in other channels. By this method, when an advertisement slot comes up, file server 102 directs each set-top box to switch for the duration of the advertisement insertion slot from the continuous broadcast program to a channel running an advertisement targeted for the individual subscriber of each set-top box. After the duration, at the end of the advertisement insertion slot, each set-top box switches back to the continuous broadcast program. Optionally, instead of file server 102, a separate component called a session controller or session manager (not shown in FIG. 1) could direct the set-top boxes to switch channels.

Figure 5:
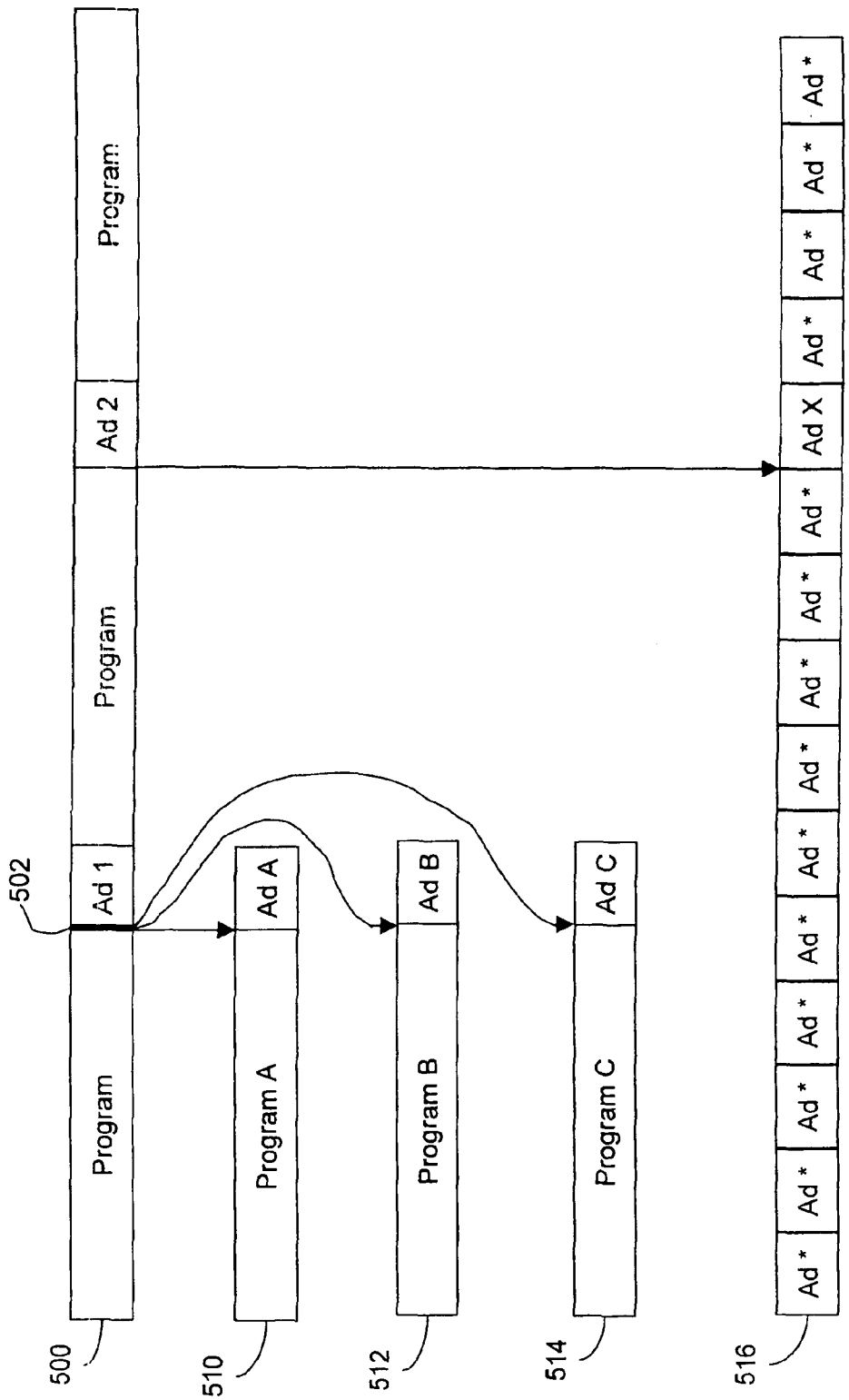
FIG. 5 is a schematic diagram of the broadcast advertisement insertion method according to an exemplary embodiment, showing the method by which set-top boxes switch from programming streams to advertisement insertion streams.

FIG. 5 illustrates the method by which the set-top boxes switch from the programming streams to the advertisement insertion streams. Program broadcast 500 is a continuous broadcast running on a particular quadrature amplitude modulation (QAM) channel in a particular program identification (PID). In FIG. 1, broadcast server 105 delivers this program broadcast 500. The continuous broadcast indicates the beginning of an advertisement insertion slot with a signal in the broadcast transmission, known as a q-tone 502. Ad 1 in program 500 would be, for example, a national advertisement that is not targeted. In contrast, Ad A, Ad B, and Ad C would be targeted local advertisements running on broadcasts 510, 512 and 514, respectively. Program broadcast 500 and broadcasts 510, 512, and 514 would each have different PIDs.

Thus, at q-tone 502, head end 110 communicates to each set-top box two items of tuning information. Knowing the customer profile or demographic group of the subscribers, head end 110 tells each set-top box 1) which PID to tune to, and 2) for how long, i.e., the duration of the advertisement insertion slot. Accordingly, the set-top boxes off-tune to the separate advertisement channel for the specified duration and tune back to program broadcast 500 after the advertisement insertion slot to resume watching the continuous broadcast program. In this manner, two subscribers watching the same program broadcast 500 can receive two different advertisements appealing to their individual tastes and viewing habits.

The separate advertisement channel can be either another programming channel whose advertisement insertion slots coincide with program broadcast 500 or can be a continuous stream of advertisements with no programming. The continuous stream of advertisements is preferred if the intervals of the advertisements line up with the programming channels that switch to it. In FIG. 5, channel 516 represents a continuous stream of advertisements to which program broadcast 500 can off-tune, e.g., to off-tune to Ad X for advertisement insertion slot 2. Optionally, instead of tuning to video advertisements, a set-top box could retrieve bit map advertisements spooled in a broadcast carousel format.

The advantage of off-tuning the set-top box is a savings in bandwidth. Instead of delivering a separate video stream with targeted advertisements to each demographic group of subscribers, the off-tuning uses only one continuous broadcasting channel and tunes to other channels to deliver targeted advertisements.

Each subscriber's profile may include other information. When the profile processor 104 assigns a customer profile to the subscriber, the profile may include more than the subscriber's viewing habits. The subscriber's profile, for example, may include information describing the subscriber's hobbies and/or interests. The profile processor 104 may determine, based on the subscriber's event data, the likes, dislikes, and interests of the subscriber. If the subscriber's event data indicates a pattern of military-history viewing habits, the subscriber may be more likely to collect military artifacts, to be interested in battle re-enactments, and to be receptive to patriotic advertising themes. The profile processor 104 may even track information describing the types of media devices accessible to the subscriber. If the subscriber requests .mp3/4 files, for example, the subscriber likely has an APPLE® iPOD® or other media delivery device (APPLE® and iPOD® are registered trademarks of Apple Computer, Inc., 1 Infinite Loop, Cupertino Calif. USA 95014). Additionally, the subscriber may specifically indicate which media devices are accessible to the subscriber and/or a set of electronic addresses for the subscriber's media devices to be included in the subscriber's profile. The subscriber's profile may also include information representing the subscriber's residence, income, other demographic information.

If any profile information indicates the subscriber has a media delivery device, then the methods, systems, and devices described herein recognize what and when content is delivered to that media device. The systems described herein may recognize when the subscriber has begun, or finished, viewing/listening/experiencing content.

As previously described, according to exemplary embodiments, playlists may be constructed based on one or more actions by the subscriber/user. An action may be, e.g., the ordering of a program, game, or other content or any other viewing event. Events may include the instances as described herein and may also include instances such as the beginning of the presentation of content to the subscriber, the conclusion of presentation of content to the subscriber, or events that may occur during the content presentation. An event that may occur during the content presentation may include an explicit audio/visual prompt that is presented to the subscriber or an implicit prompt. An explicit prompt may be a visual image that is presented on the screen to which the subscriber responds, for example, by pressing a button on their remote control device. An implicit prompt might be, for example, the presence of a product placement within the content (for example, a brand-name product is included within the context of the content).

A playlist may contain one or more elements consisting of electronic files of any type. When, for example, the subscriber has finished watching a downloaded show, that's the point in time when marketers have the subscriber's full attention. When, for instance, the subscriber has finished watching a concert, the subscriber may wish to download songs or other related content contained in electronic files related to the musical group that performed at the concert. Here, then, these systems, methods, and devices would build a playlist of songs, advertisements, interviews, videos, and/or promotional items related to the concert, the musical group that performed at the concert, or other related information, based on the customer's profile. The playlist might also include, but is not limited to, files that contain ringtones, lyrics, and alternative media formats. Additionally, playlists might contain links to additional electronic content such as web pages. The playlist may additionally or alternatively be delivered to any destination, such as one of the subscriber's media devices or any media device accessible to the subscriber. The playlist may be delivered to one or more alternate destinations, such as an e-mail destination, or delivered directly to any of the subscriber's media devices.

The playlist could also be based on a specific viewing event. The playlist could be built and delivered according to timing within a viewing event. The playlist, for example, could be delivered and played at the beginning of content, during the content, and/or at the end of the content. Returning to the example of the concert, one or more playlists may be built and/or delivered for execution in the middle of the concert. The playlist may trigger accessing the subscriber's profile, analyzing the subscriber's event data, and targeting advertisements for maximum response to marketing offers.

The elements contained within a playlist may be offered to the subscriber with or without a charge. Once a playlist is constructed and offered to the subscriber, the subscriber is further presented with the opportunity to optionally purchase any or all of the elements contained within the playlist for which a charge is included. The subscriber may then elect to access or otherwise gain access to or save any of the elements contained within the playlist by well-known electronic download and electronic commerce means.

The foregoing disclosure of the exemplary embodiments has been presented for purposes of illustration and description. It is not intended to be exhaustive nor limiting to the precise forms disclosed. Many variations and modifications of the embodiments described herein will be obvious to one of ordinary skill in the art in light of the above disclosure. The scope of the exemplary embodiments is to be defined only by the claims appended hereto, and by their equivalents.

What is claimed is:
1. A method, comprising:
receiving an upload of commands at a server, the upload of the commands sent from a media device, the commands entered by a user of the media device while displaying content at the media device;

determining, after receipt of the upload of the commands, an available advertisement insertion slot in the content;

uploading additional commands entered since the receipt of the upload of the commands;

associating only the additional commands to a playlist that corresponds to recent viewing habits occurring since the receipt of the upload of the commands;

retrieving the playlist at the server; and sending the playlist from the server to the media device.

2. The method of claim 1, further comprising receiving the additional commands.

3. The method of claim 1, further comprising assigning the additional commands to a demographic.

4. The method of claim 1, further comprising building the playlist to appeal to the additional commands.

5. The method of claim 1, further comprising building the playlist.

6. The method of claim 1, further comprising building the playlist to appeal to a profile.

7. The method of claim 1, further comprising sending a library of advertisements.

8. The method of claim 1, further comprising receiving a request for a movie.

9. The method of claim 1, wherein sending the playlist comprises sending a library of advertisements.

10. The method of claim 1, wherein sending the playlist comprises sending a soundtrack.

11. The method of claim 1, further comprising inserting a targeted advertisement into the advertisement insertion slot.

12. A system for targeting a playlist, comprising:

a processor; and memory storing instructions that when executed cause the processor to perform operations, the operations comprising:

receiving an upload of commands entered at a media device while displaying content;

determining, after receipt of the upload of the commands, an available advertisement insertion slot in the content;

uploading latest commands entered at the media device since the receipt of the upload of the commands;

associating only the latest commands to a playlist; and sending the playlist to a destination.

13. The system of claim 12, wherein the operations further comprise the tracking media device using a file extension of a requested file.

14. The system of claim 12, wherein the operations further comprise retrieving the playlist.

15. The system of claim 12, wherein the operations further comprise retrieving a targeted advertisement selected to appeal to the latest commands.

16. The system of claim 12, wherein the operations further comprise receiving a library of advertisements.

17. The system of claim 12, wherein the operations further comprise receiving an order for a movie.

18. The system of claim 12, wherein the operations further comprise selecting a library of advertisements associated with the latest commands.

19. The system of claim 12, wherein the operations further comprise receiving a trailer.

20. The system of claim 12, wherein the operations further comprise receiving a specification for the available advertisement insertion slot.

21. The system of claim 12, wherein the system is a set-top box.

22. The system of claim 12, wherein the system is a set-top box integrated with a television.

23. The system of claim 12, wherein the system is a computer.

24. A memory storing instructions that when executed cause a processor to perform operations, the operations comprising:

receiving an upload of events sent from a media device, the upload of events entered while receiving programming at the media device;

determining an availability of an advertisement insertion slot in the programming;

uploading latest events entered at the media device since the receipt of the upload of events;

associating only the latest events to a playlist; and sending the playlist to the media device, wherein the playlist is chosen independent of profiling the media device.

25. The memory of claim 24, wherein the operations further comprise creating the playlist.

26. The memory of claim 24, wherein the operations further comprise receiving a command as the latest events.

27. The memory of claim 24, wherein the operations further comprise receiving a command in the upload of the events.

28. The memory of claim 24, wherein the operations further comprise assigning a demographic to the latest events.

29. The memory of claim 24, wherein the operations further comprise receiving a response to a prompt.

30. The memory of claim 24, wherein the playlist comprises an advertisement.

31. The memory of claim 24, wherein the operations further comprise sending the playlist to a destination.

32. The memory of claim 24, wherein the operations further comprise sending the playlist to a destination associated with a user of the media device.

33. The memory of claim 24, wherein the operations further comprise making an offer to purchase an element of the playlist.

* * * * *